Patented May 31, 1927.

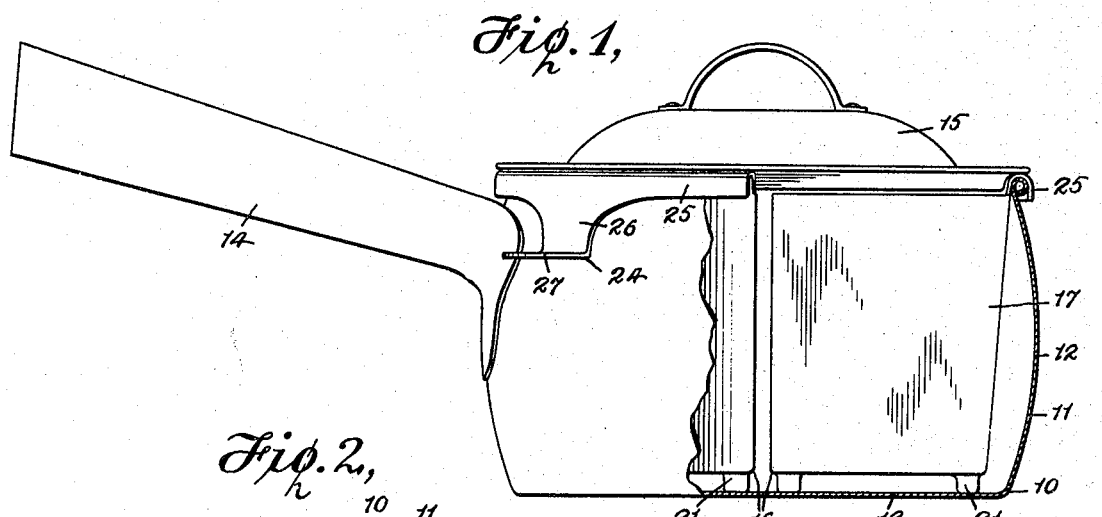

1,630,787

UNITED STATES PATENT OFFICE.

CATHERINE F. CULLEN, OF NEW YORK, N. Y.

COOKING UTENSIL.

Application filed September 18, 1925. Serial No. 57,159.

This invention relates more particularly to a class of culinary articles.

My invention has for its object primarily to provide a utensil designed to be employed for boiling, steaming and stewing food products, such as the preparation of soups and the cooking of vegetables or the like, and which is of a form including a plurality of receptacles for allowing a number of different products to be cooked simultaneously as well as enabling if desired the heating process to be accomplished by employing the flame of a single gas burner or a single heat opening of a stove in order to save the consumption of fuel and to permit a variety of food products to be cooked as occasion requires in places where the spaces for such work are comparatively limited.

The invention consists essentially of a pot of a suitable size and shape, and within the pot are a plurality of removable heatable receptacles for holding various vegetables and other food products to be cooked. These receptacles may be orificed or free from apertures in order to permit the cooking process of the products to be accomplished by boiling, stewing or steaming. The receptacles have each an outer wall of such a shape that the outer walls of all the receptacles conform to the shape of the side wall of the body of the pot, and each receptacle has angular inner walls of such sizes and shapes that the inner walls of all the receptacles are in proximity with their corners which are opposite to the outer walls being positioned adjacent each other at the center of the interior of the body of the pot so that the products in all of the receptacles may be cooked simultaneously over a single flame.

A further object of the invention is to provide a cooking utensil of a simple, efficient and durable construction which may be made in appropriate sizes and shapes.

With these and other objects in view, the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is an elevation, partly broken away, of one form of cooking utensil embodying my invention.

Fig. 2 is a top plan, partly fragmentary, of the utensil with the cover of the pot removed.

Fig. 3 is a sectional view taken through a slightly modified form of one of the receptacles used in the utensil.

Fig. 4 is a perspective view of another modified form of one of the receptacles used in the utensil, and Fig. 5 is a sectional view taken on the line 5—5 of Fig. 4.

The utensil has a container or pot, as 10, which may be of any suitable size and shape of the ordinary type commonly used for boiling, stewing or heating purposes in the processes of cooking edibles, though the form of the pot illustrated has a hollow body 11 with a cylindrical side wall 12, bottom 13, and a handle, as 14, protruding laterally from an upper part of the side wall. On the mouth or entrance of the body 11 may be a removable cover, as 15.

Interiorly of the body 11 of the pot are a number, preferably four receptacles, as 16, for holding edibles, such as vegetables, cereals and other food products for being cooked, and all of these receptacles are of similar shapes and sizes. Each of the receptacles 16 is made of metal or enameled metal adapted to withstand heat, and each receptacle has an outer wall 17, angular inner walls 18, 19 which extend from the side edges of the outer wall to a corner or intersecting angle on a line with the center of the outer wall. The lower ends of the outer and inner walls of each receptacle is closed by a bottom wall 20. The outer walls of all of the receptacles are curved to conform with the curvature circumferentially of the wall 12 of the body 11 of the pot, and the outer wall of each of the receptacles is of a width somewhat less than one-fourth the circumference of the side wall of the body of the pot. The inner walls are preferably disposed at right angles to the outer walls, and each of the receptacles is, therefore, of approximately a segmental shape. The receptacles are also of such sizes that their side walls are in closely spaced parallel relation when their corners which are opposite to the outer walls being positioned adjacent to or closely spaced to each other at the center of the interior of the body of the pot. The receptacles 16 are somewhat less than the height of the side wall of the body of the pot, and extending downwardly from the underside of the bottom 20 at the corners of each receptacle may be three feet, as 21. The feet of all of the receptacles are of lengths for elevating the receptacles above the bottom of the body of the pot and so that the upper edges of the walls of the receptacles are preferably on a level with the upper edge of the side wall 12 of the body of the pot.

In Figs. 1 and 2 forms of the receptacles 16 are shown having imperforate walls, while the form shown in Fig. 3 is provided with the outer wall and inner walls having orifices 22, and in Figs. 4 and 5 the walls and bottom are made of woven wire, to provide interstices, as 23, in the receptacles. The receptacles are made of sizes for being positioned in the body of the pot in spaced relation and the feet 21 being provided to elevate the receptacles so that water may be used in the body of the pot as well as in the form of the receptacles, shown in Figs. 1 and 2, or water placed in the body of the pot will flow into the forms of orificed and intersticed receptacles shown in Figs. 3, 4, 5, in order to allow various food products to be cooked according to different processes.

On each of the receptacles 16 may be a handle 24 for allowing the receptacles to be conveniently arranged within and removed from the body of the pot. Each of the handles 24 of the forms of the receptacles shown in Figs. 1, 2, 3 has an arched portion, as 25, integrally formed with and extending upwardly above and overhanging the outer wall 17 of its respective receptacle. The arched portion 25 of the handle of each of the receptacles is curved to conform with the curvatures of the outer wall and with the side wall 12 of the body of the pot, and this arched portion of the handle of each receptacle is of sufficient width so that the arched portions of all the handles are disposed in straddling positions upon the upper edge of the body of the pot. The handle of each receptacle has a part, as 26, which protrudes downwardly of the exterior of the outer wall of the receptacle, and each handle terminates with an extension or apertured lug, as 27, which protrudes angularly in a lateral direction from the part 26 and from the outer wall of its receptacle. In the form of the intersticed receptacle 16 illustrated in Figs. 4 and 5 the arched portion 25 of the handle is soldered or welded, as at 28, or otherwise fastened to the upper part of the outer wall 17 for being disposed similarly to the positions of the handles of the forms of the receptacles shown in Figs. 1, 2, 3.

In the foregoing description, I have embodied the preferred form of my invention, but I do not wish to be understood as limiting myself thereto as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

In combination, a container, a triangular shaped receptacle adapted to be positioned within the said container, the walls of said receptacle being imperforate and the front wall curved to conform to the shape of the container, the top edges of the said walls being reenforced, an arched member overlying and rigidly attached to the top edge of the said front curved wall, said arched member having a depending extension and an outwardly extended handle portion formed integral therewith protruding considerably beyond the wall of the said container.

This specification signed and witnessed this 17th day of September, A. D. 1925.

CATHERINE F. CULLEN.